(12) United States Patent
Sugiyama et al.

(10) Patent No.: US 9,081,268 B2
(45) Date of Patent: Jul. 14, 2015

(54) LIGHTING DEVICE AND PROJECTION-TYPE DISPLAY APPARATUS INCLUDING LIGHTING DEVICE

(75) Inventors: Hiroki Sugiyama, Osaka (JP); Hiroshi Kitano, Hyogo (JP); Shigekazu Yamagishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 392 days.

(21) Appl. No.: 13/480,478

(22) Filed: May 25, 2012

(65) Prior Publication Data

US 2012/0300178 A1    Nov. 29, 2012

(30) Foreign Application Priority Data

May 25, 2011    (JP) ................................. 2011-117052

(51) Int. Cl.
*G03B 21/00* (2006.01)
*G03B 21/20* (2006.01)
*G03B 33/12* (2006.01)
*H04N 9/31* (2006.01)

(52) U.S. Cl.
CPC .......... *G03B 21/204* (2013.01); *G03B 21/2013* (2013.01); *G03B 33/12* (2013.01); *H04N 9/3111* (2013.01); *H04N 9/3161* (2013.01); *H04N 9/3164* (2013.01)

(58) Field of Classification Search
CPC ............. G03B 21/204; G03B 21/2033; G03B 21/2013; G02B 19/0095

USPC ............................................... 362/84; 353/31
See application file for complete search history.

(56) References Cited

U.S. PATENT DOCUMENTS

| | | | | |
|---|---|---|---|---|
| 2008/0012805 | A1* | 1/2008 | Duncan et al. ................... | 345/84 |
| 2008/0158522 | A1* | 7/2008 | Seo .................................. | 353/85 |
| 2010/0238412 | A1* | 9/2010 | Kurosaki ......................... | 353/31 |
| 2011/0063581 | A1* | 3/2011 | Iwanaga .......................... | 353/31 |
| 2011/0116253 | A1 | 5/2011 | Sugiyama | |
| 2011/0149549 | A1* | 6/2011 | Miyake ........................... | 362/84 |

FOREIGN PATENT DOCUMENTS

| | | |
|---|---|---|
| JP | 2004-341105 A | 12/2004 |
| JP | 2005-347263 A | 12/2005 |
| JP | 2008-009324 A | 1/2008 |
| JP | 2010-086815 A | 4/2010 |
| JP | 2010-237443 A | 10/2010 |
| JP | 2011-013316 A | 1/2011 |
| JP | 2012-137608 A | 7/2012 |
| JP | 2012-142222 A | 7/2012 |

* cited by examiner

*Primary Examiner* — Sultan Chowdhury
*Assistant Examiner* — Danell L Owens
(74) *Attorney, Agent, or Firm* — James W. Judge

(57) ABSTRACT

A lighting device configured to output light of predetermined color includes: a plurality of solid-state light sources including at least a first solid-state light source and a second solid-state light source; a drive section configured to drive each of the plurality of solid-state light sources individually; a first phosphor for excitation by first emission light emitted from the first solid-state light source; and a second phosphor for excitation by second emission light emitted from the second solid-state light source, and first fluorescence and second fluorescence are of different color.

20 Claims, 11 Drawing Sheets

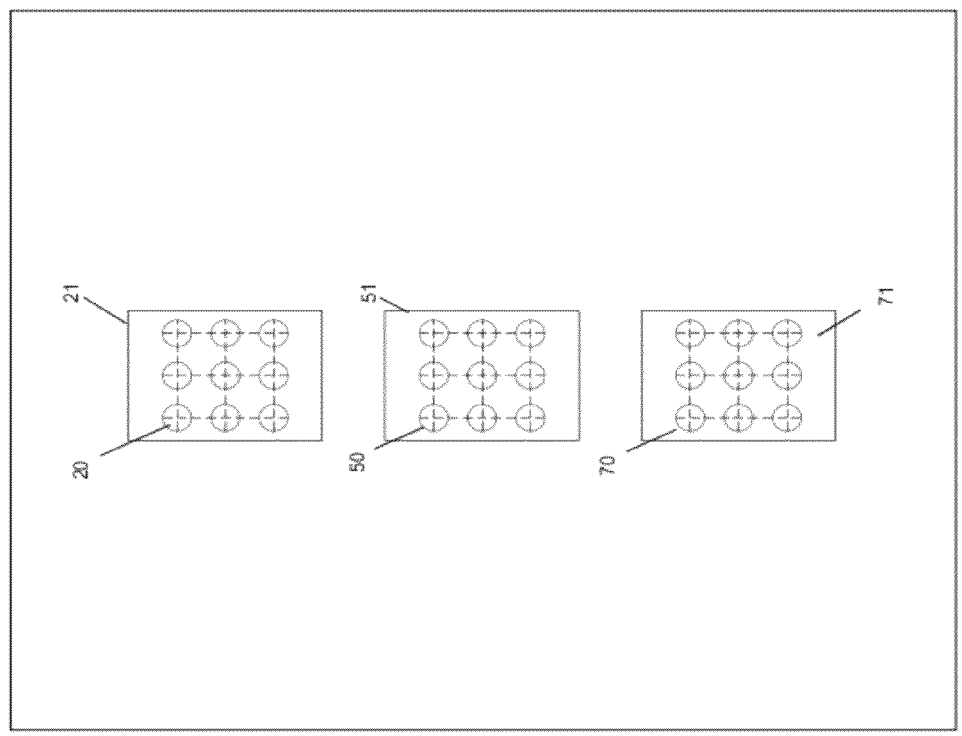

LIGHTING DEVICE AND PROJECTION-TYPE DISPLAY APPARATUS INCLUDING LIGHTING DEVICE

BACKGROUND OF THE INVENTION

1. Field of the Invention

The present invention relates to lighting devices and projection-type display apparatuses including a lighting device, and more particularly relates to a lighting device furnished with a plurality of light sources and capable of changing the lighting timing and the intensity of each light source individually, and to a projection-type display apparatus including the lighting device.

2. Description of the Background Art

Lighting devices including a light source are incorporated in, for example, projectors that concentrate light emitted from the light source onto a display element called a DMD (digital micromirror device) or onto a liquid crystal panel and thereby display a color image (color video image) on a screen. Most such lighting devices incorporated in projectors or the like have used discharge lamps with high brightness as their light sources. In recent years, however, many devices that use LEDs (light emitting diodes), laser diodes, organic electroluminescence, fluorescence emission, or the like, have been developed and proposed.

For example, a lighting device has been proposed that includes a solid-state light source and a circular plate-shaped phosphor wheel that is composed of a transparent base material and on which a phosphor layer is formed. The phosphor layer receives ultraviolet light emitted from the solid-state light source as excitation light, and converts the ultraviolet light to visible light.

The proposed lighting device can emit fluorescence in wavelength bands of red, green, and blue, by irradiating the phosphor layer formed on the surface of the wheel with the excitation light. However, the excitation light, which is irradiated onto phosphors of red, green, and blue, cannot be changed for each phosphor. Therefore, in the proposed device, most suitable excitation light cannot be selected for each phosphor, which causes a problem of insufficient brightness of the fluorescence.

In view of the above problem, a lighting device has been proposed that uses a combination of a phosphor wheel having a phosphor of high luminous efficiency, a plurality of light sources for exciting phosphors, and a monochromatic light source for emitting light in a wavelength band appropriate for a phosphor of relatively low luminous efficiency.

FIG. 10 is a diagram illustrating a phosphor wheel used for a conventional lighting device. As shown in FIG. 10, the surface of the phosphor wheel is divided into a plurality of segment areas 901, 902, and 903 onto which different phosphors have been respectively applied. The segment areas are formed on the surface of the phosphor wheel so as to be adjacent to each other. With this structure of the phosphor wheel, desired color light can be obtained by controlling lighting and extinction of the plurality of light sources, and controlling rotation of the phosphor wheel in accordance with the emission of light.

As described above, the proposed lighting device can produce light of desired color by controlling rotation of the phosphor wheel such that, at the moment when a light source emits light, a predetermined phosphor is located at a position illuminated with the emitted light. However, as described above, the phosphors are applied only to the segment areas divided on the surface of the wheel. Therefore, in order to obtain white light, for example, the following steps must be performed. First, blue light is emitted from a first light source and transmitted through a transmission section of the phosphor wheel, and meanwhile, the phosphor wheel is rotated to irradiate a first segment area with the blue light and thereby to obtain green fluorescence. Then, the first light source is turned off, and red light is emitted from a second light source, and the fluorescence and the light are combined. A problem in this case is that with the blue light and green light being obtained by means of the first light source, the intensities of the obtained color light are not sufficient. Further, the proposed lighting device cannot produce light of a preferred color at a desired timing, which is inefficient.

SUMMARY OF THE INVENTION

The present invention has been made in view of the conventional problems, and an object of the present invention is to make available a lighting device that includes a plurality of light sources and can control the lighting timing and the intensity of each light source individually, that can always produce fluorescence (or projection light) having the same wavelength regardless of the lighting timing of each light source, and that can combine the produced fluorescence (or projection light) to obtain color light of high intensity, and an object is to make available a projection-type display apparatus including the lighting device.

The lighting device of the present invention is a lighting device that outputs light of predetermined color. In order to attain the above object, the lighting device of the present invention includes: a plurality of solid-state light sources including at least a first solid-state light source and a second solid-state light source; a drive section configured to drive each of the plurality of solid-state light sources individually; a first phosphor for excitation by first emission light emitted from the first solid-state light source; and a second phosphor for excitation by second emission light emitted from the second solid-state light source. First fluorescence emitted from the first phosphor and second fluorescence emitted from the second phosphor are of different color.

With this feature of the present invention, the lighting device including the plurality of light sources can control the lighting timing and the intensity of each light source individually, can always produce fluorescence (or projection light) having the same wavelength regardless of the lighting timing of each light source, and can combine the produced fluorescence (or projection light) to obtain color light of high intensity.

The first phosphor and the second phosphor may be applied onto the same phosphor substrate.

With this feature of the present invention, the number of components can be reduced, and the size and weight of the lighting device can be reduced.

Preferably, the plurality of solid-state light sources further includes a third solid-state light source, and third emission light emitted from the third solid-state light source is outputted not through excitation of any phosphor. Alternatively, it is preferred that the lighting device further includes a third phosphor for excitation by the third emission light emitted from the third solid-state light source to emit third fluorescence having a wavelength longer than those of the first fluorescence and the second fluorescence.

With this feature of the present invention, light of three different colors can be obtained at the same time, and thereby it is possible to obtain, for example, white light of high intensity.

Here, if the wavelengths of emission light emitted from the plurality of solid-state light sources are different from each other, the solid-state light source that emits light of optimal color can be selected for each phosphor. If all of the wavelengths of emission light emitted from the plurality of solid-state light sources are the same, the types of solid-state light source can be unified. Therefore, cost reduction can be achieved, and each light source can easily be driven.

In addition, the lighting device may include an intensity distribution changing section configured to dynamically change the intensities of the plurality of light sources in accordance with at least one of an image-display mode and a displayed image.

With this feature of the present invention, in a case where, for example, an image with a large proportion of green is displayed, the intensity of light of color other than green can selectively be reduced, and therefore, electricity can be saved and the brightness of the image can freely be adjusted.

Preferably, the first fluorescence, the second fluorescence, and the third emission light or the third fluorescence are combined to obtain white light.

With this feature of the present invention, white light can be reproduced by continuously emitting red, green, and blue light, unlike in the case of conventional devices in which different phosphors applied onto segment areas are irradiated with excitation light from light sources, and red, green, and blue light are intermittently emitted in a short time to reproduce white light. Therefore, white light of high intensity can be obtained.

In addition, the lighting device may include optical means configured to combine the first fluorescence, the second fluorescence, and the third emission light or the third fluorescence into a beam of light.

With this feature of the present invention, the different types of emission light or fluorescence can be combined into a uniform beam of light, and thereby white light of high intensity can be obtained.

If the phosphor substrate is a circular substrate that can be controlled to rotate, positions on the phosphor substrate that are irradiated with excitation light can be changed as appropriate, and it is thus possible to efficiently release heat generated when the phosphors emit fluorescence. As a result, stable fluorescence can be obtained.

Further, if the first phosphor and the second phosphor are concentrically applied onto different areas of the phosphor substrate, the second phosphor can continue to be irradiated with the second emission light from the second solid-state light source while the first phosphor is being irradiated with the first emission light from the first solid-state light source. Therefore, the first fluorescence and the second fluorescence can be combined to obtain color light of high intensity.

Typically, it is preferred that an optical axis of the first fluorescence, an optical axis of the second fluorescence, and an optical axis of the third fluorescence or the third emission light are parallel to each other.

With this feature of the present invention, an optical axis to be obtained can easily be synthesized. This allows for synthesis of, for example, white light of high intensity.

In addition, if the first solid-state light source, the second solid-state light source, and the third solid-state light source are each a semiconductor laser that emits blue light, and the first fluorescence is green and the second fluorescence is red, it is possible to efficiently obtain white light by using blue light as projection light and combining the blue light with the green fluorescence and the red fluorescence. Unlike in a case where blue fluorescence is used, since projection light is used for blue color, the loss due to conversion does not occur, which is advantageous. Further, since a component for obtaining blue fluorescence is not required, the size of the entire lighting device can be reduced.

Alternatively, if the first solid-state light source, the second solid-state light source, and the third solid-state light source are each a semiconductor laser that emits ultraviolet light, and the first fluorescence is green, the second fluorescence is red, and the third fluorescence is blue, blue color can be prevented from becoming too dark, a desired color can easily be reproduced by combining the blue fluorescence with the other fluorescence, and the quality of an image to be obtained can be improved, as compared to when blue light that is projection light is used.

Furthermore, a projection-type display apparatus can be built that includes the lighting device of the present invention, optical means configured to guide a beam of emission light emitted from the lighting device, an image display element configured to modulate the emission light guided by the optical means in accordance with an image signal, and a projection lens configured to project the emission light modulated by the image display element onto a screen.

According to the present invention, a lighting device including a plurality of light sources can control the lighting timing and the intensity of each light source individually. Therefore, it is possible to provide a lighting device that can always produce fluorescence (or projection light) having the same wavelength regardless of the lighting timing of each light source, and that can combine the produced fluorescence (or projection light) to obtain color light of high intensity, and it is possible to provide a projection-type display apparatus including the lighting device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating solid-state light sources 20, 50, and 70 used for the lighting device 100 shown in FIG. 1;

DESCRIPTION OF THE PREFERRED EMBODIMENTS

Hereinafter, lighting devices according to embodiments of the present invention will be described with reference to the drawings.

First Embodiment

Figure 1:
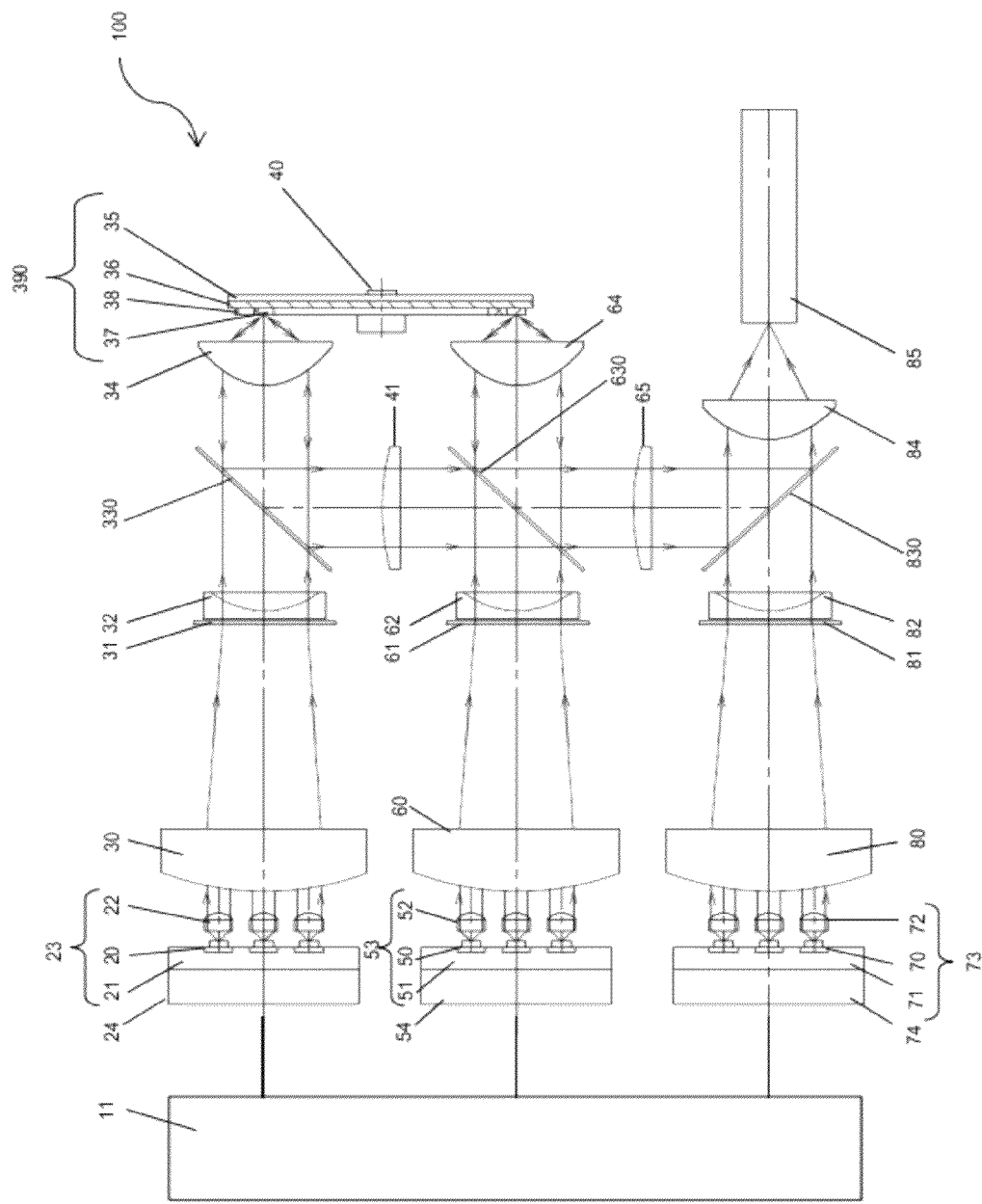
FIG. 1 is a diagram showing the configuration of a lighting device 100 according to a first embodiment of the present invention.
Figure 2:
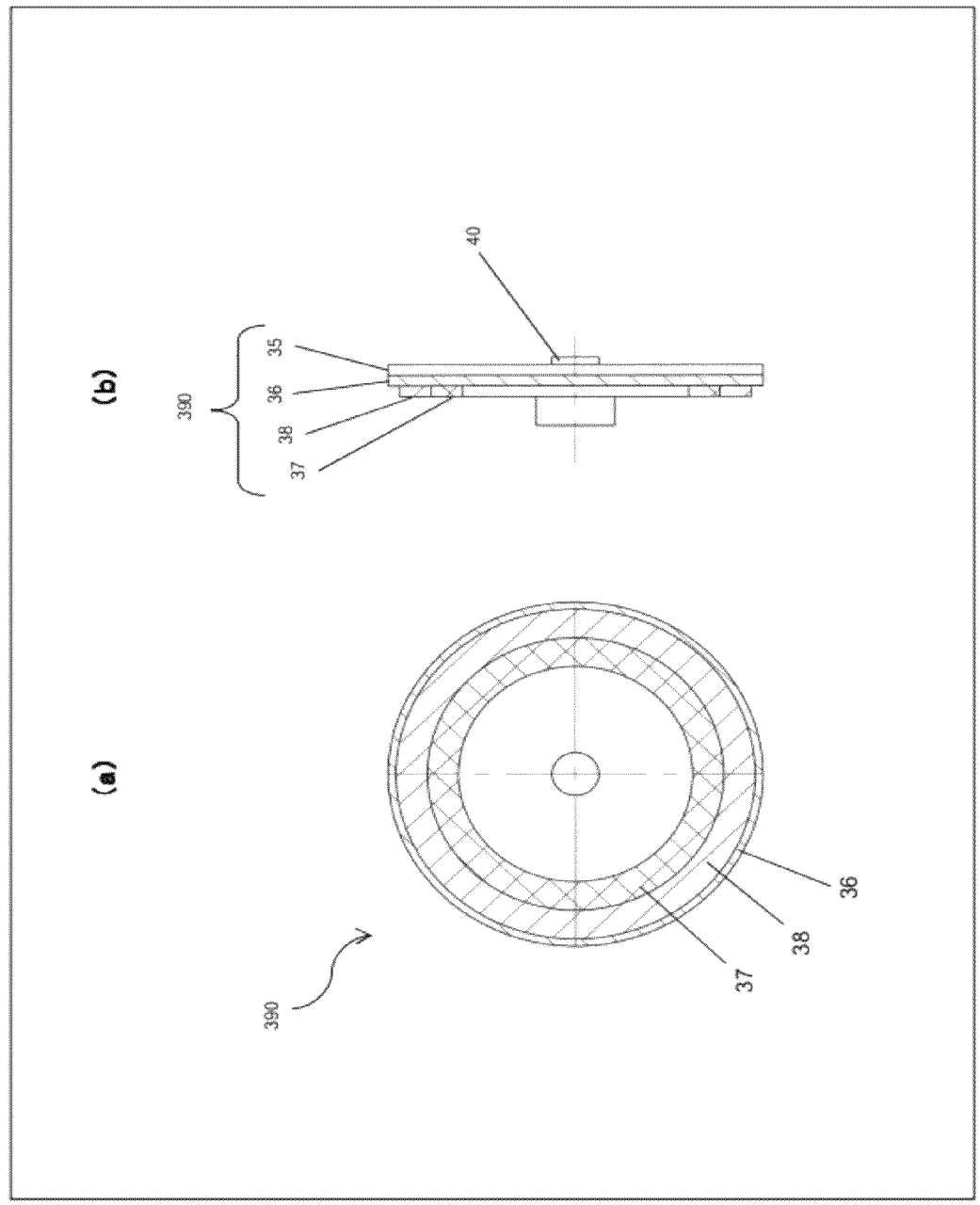
FIG. 2 is a diagram illustrating a phosphor substrate 390 used for the lighting device 100 shown in FIG. 1.
Figure 4A:
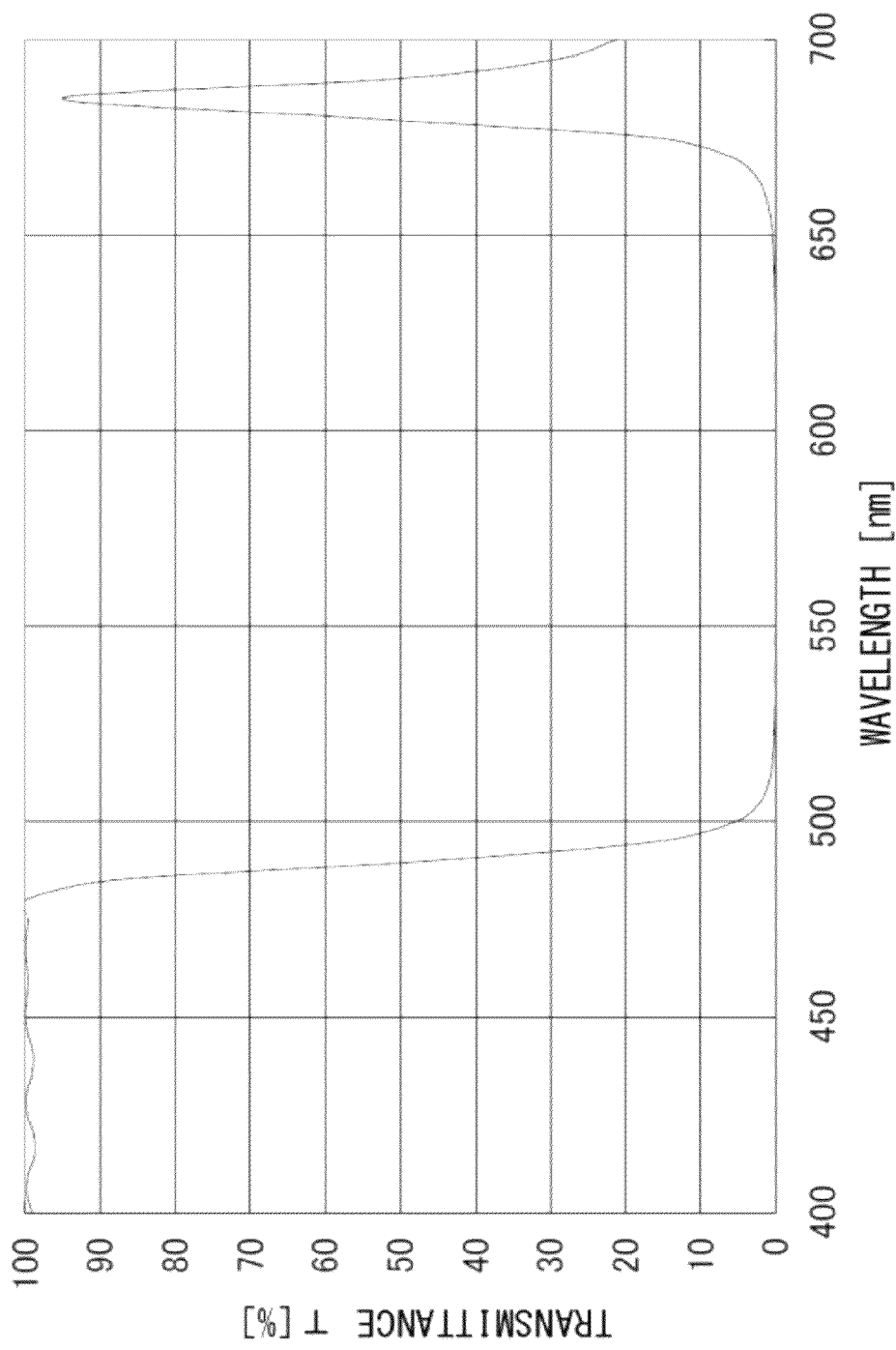
FIG. 4A is a diagram showing the spectral characteristics of a dichroic mirror 330 used for the lighting device 100 shown in FIG. 1.
Figure 4B:
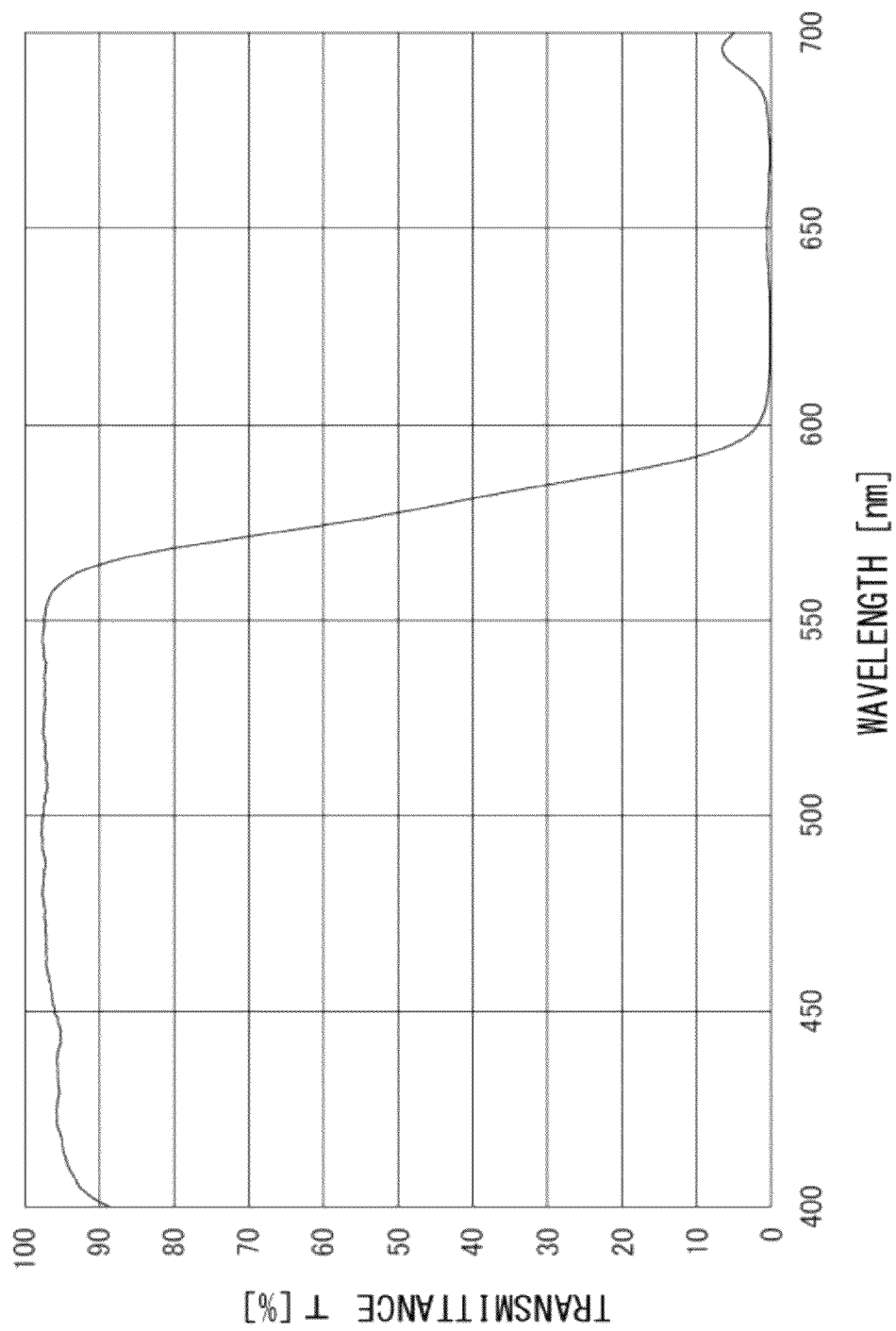
FIG. 4B is a diagram showing the spectral characteristics of a dichroic mirror 630 used for the lighting device 100 shown in FIG. 1.

FIG. 1 is a diagram showing the configuration of a lighting device 100 according to a first embodiment of the present invention. FIG. 2 is a diagram illustrating a phosphor substrate 390 used for the lighting device 100 shown in FIG. 1, and (a) is a plan view, and (b) is a side view. FIG. 3 is a diagram illustrating solid-state light sources 20, 50, and 70 used for the lighting device 100 shown in FIG. 1. FIG. 4A is a diagram showing the spectral characteristics of a dichroic mirror 330 used for the lighting device 100 shown in FIG. 1. FIG. 4B is a diagram showing the spectral characteristics of a dichroic mirror 630 used for the lighting device 100 shown in FIG. 1.

As shown in FIG. 1, the lighting device 100 according to the first embodiment includes: a first solid-state light source 20; a second solid-state light source 50; a third solid-state light source 70; plates 21, 51, and 71 that hold the solid-state light sources 20, 50, and 70, respectively; cooling devices 24, 54, and 74 for cooling the solid-state light sources 20, 50, and 70, respectively, which generate heat; collimating lenses 22, 52, and 72 that are located to the front of the solid-state light sources 20, 50, and 70, respectively; condenser lenses 30, 60, and 80 that are located to the front of the collimating lenses 22, 52, and 72, respectively; optical components (diffuser panels 31, 61, 81, concave lenses 32, 62, and 82, dichroic mirrors 330, 630, and 830, and collecting lenses 34, 64, and 84) that are located to the front of the condenser lenses 30, 60, and 80, respectively; the phosphor substrate 390; a motor 40; relay lenses 41 and 65; and optical means 85. Further, the lighting device 100 includes a drive section 11 for driving each of the first solid-state light source 20, the second solid-state light source 50, and the third solid-state light source 70 individually. The type of the drive section 11 is not particularly limited. In the present embodiment, a pulse drive current source is used as the drive section 11. Further, in the present embodiment, the drive section 11 includes an intensity distribution changing section that dynamically changes the intensities of the plurality of light sources in accordance with an image-display mode or with a displayed image. If the intensity distribution changing section is thus provided, in a case where, for example, an image with a large proportion of green is displayed, the intensity of light of color other than green can selectively be reduced, and therefore, electricity can be saved and the brightness of the image can freely be adjusted. Each of the components and the arrangement thereof will be described below.

<Solid-State Light Source>

In the lighting device 100, each of the solid-state light sources is a light source that emits light used to produce desired color light. The type of the solid-state light sources is not particularly limited. For example, semiconductor lasers or LEDs can be used. Each solid-state light source is composed of one unit light source or a plurality of unit light sources electrically connected in series by a wiring base (e.g. a printed circuit board or the like) (not shown). The number of unit light sources is not particularly limited. However, if a solid-state light source is composed of a single unit light source, the intensity of light to be emitted will be low, and therefore, such a solid-state light source is not suitable for use in a projection-type display apparatus such as a projector. Accordingly, it is preferable to electrically connect a plurality of unit light sources in series. FIG. 3 shows an example of the configuration of the solid-state light sources, where nine unit light sources are arranged in three rows and three columns. In the lighting device 100, as shown in FIG. 1, the first solid-state light source 20 is provided in a first light source unit 23, the second solid-state light source 50 is provided in a second light source unit 53, and the solid-state light source 70 is provided in a third light source unit 73. The wavelength of light emitted from each solid-state light source is not particularly limited. In the present embodiment, semiconductor lasers emitting blue laser light with a wavelength of 448 nm are used.

Semiconductor lasers generate heat by emitting laser light, and the intensity of laser light to be emitted is reduced due to the generated heat. Therefore, as shown in FIG. 1, the solid-state light sources are preferably cooled by cooling devices (e.g., the cooling device 24 for the first solid-state light source 20) via plates (e.g., the plate 21 for the first solid-state light source 20). The material of the plates is not particularly limited. In the present embodiment, plates made of copper, which is a material having high heat conductivity, are used. In addition, the type of the cooling devices is not particularly limited. Cooling devices adopting various types of cooling methods, such as cooling by blown air, cooling by gas, cooling by phase change, and cooling by liquid, can be used. In the present embodiment, cooling devices composed of heat sinks made of copper are used.

The first solid-state light source 20 is a light source that emits blue laser light (referred to as first emission light). The first emission light emitted from the first solid-state light source 20 is collimated by the collimating lenses 22, and then condensed by the condenser lens 30, and is incident on the optical components arranged on the optical path. The heat generated from the first solid-state light source 20 is removed by the cooling device 24 via the plate 21.

The second solid-state light source 50 is a light source that emits blue laser light (referred to as second emission light). The second emission light emitted from the second solid-state light source 50 is collimated by the collimating lenses 52, and then condensed by the condenser lens 60, and is incident on the optical components arranged on the optical path. The functions of the plate 51 and the cooling device 54 are the same as those of the plate 21 and the cooling device 24 described above, and the description thereof is omitted.

The third solid-state light source 70 is a light source that emits blue laser light (referred to as third emission light). The third emission light emitted from the third solid-state light source 70 is collimated by the collimating lenses 72, and then condensed by the condenser lens 80, and is incident on the optical components arranged on the optical path. The functions of the plate 71 and the cooling device 74 are the same as those of the plate 21 and the cooling device 24 described above, and the description thereof is omitted.

The third solid-state light source 70 is essential to obtain white light. However, the third solid-state light source 70 is not essential for the purpose of obtaining color light that can be synthesized by using the first emission light and the second emission light described above. In this case, the third solid-state light source 70 is preferably eliminated because the size and weight of the lighting device can be reduced and the production cost can be lowered.

<Phosphor Substrate>

The phosphor substrate 390 is a substrate including a main body 35 which is a flat plate, and phosphors 37 and 38 applied onto the surface of the main body 35. The phosphor substrate 390 is characterized in that when the phosphors 37 and 38 are irradiated with excitation light, the corresponding fluorescence are emitted. The material of the main body 35 is not particularly limited, and various metals, resins, or the like can be used. In the present embodiment, a phosphor substrate 390 made of aluminum is used because aluminum has high heat radiation performance. Further, a coating layer 36 is preferably provided between the main body 35 and the phosphors 37 and 38 in order to enhance the reflectance for the emission light. In the present embodiment, a coating layer 36 for which silver is used is provided. The shape of the phosphor substrate 390 is not particularly limited, and various shapes can be adopted. As shown in FIG. 2, a main body 35 that is a circular flat plate is used for the phosphor substrate 390 of the present embodiment, from the standpoint that the main body 35 can be controlled so as to be rotated by the motor 40 about the center of the circle in order to release heat generated when the phosphors 37 and 38 convert excitation light, and from the standpoint that positions irradiated with light emitted onto the phosphors 37 and 38 can be adjusted. Further, in the present embodiment, as shown in FIG. 2, after the coating layer 36 is formed on the surface of the main body 35 which is circular, the first phosphor 37 and the second phosphor 38 are applied concentrically. The first phosphor 37 is irradiated with the first emission light, and emits first fluorescence, while the second phosphor 38 is irradiated with the second emission light, and emits second fluorescence.

In the present embodiment, a light source that emits blue laser light is used as the first solid-state light source 20. Therefore, a phosphor that is excited by blue laser light and emits green fluorescence (first fluorescence) is applied as the first phosphor 37. In addition, a light source that emits blue laser light is used as the second solid-state light source 50. Therefore, a phosphor that is excited by blue laser light and emits red fluorescence (second fluorescence) is applied as the second phosphor 38. The method for applying the first phosphor 37 and the second phosphor 38 onto the main body 35 (onto the coating layer 36) is not particularly limited. For example, an application method can be used in which band-shaped recesses are formed on the main body 35 (or the coating layer 36), and a paste composed of a phosphor and an organic or inorganic substance is discharged from a nozzle into the recesses while the nozzle is being moved.

As shown in FIG. 2, the first phosphor 37 and the second phosphor 38 are concentrically applied over the entire 360 degrees continuously. Therefore, even in a case where, for example, the lighting timing or the intensity of the first solid-state light source 20 or the second solid-state light source 50 is adjusted, fluorescence having the same wavelength can always be obtained.

<Optical Components>

As shown in FIG. 1, the optical components for the first emission light emitted from the first solid-state light source 20 include the diffuser panel 31, the concave lens 32, the dichroic mirror 330, and the collecting lens 34. The optical components for the second emission light emitted from the second solid-state light source 50 include the diffuser panel 61, the concave lens 62, the dichroic mirror 630, and the collecting lens 64. The optical components for the third emission light emitted from the third solid-state light source 70 include the diffuser panel 81, the concave lens 82, the dichroic mirror 830, and the collecting lens 84.

As shown in FIG. 1, the first emission light is incident on the dichroic mirror 330 via the diffuser panel 31 and the concave lens 32. The dichroic mirror 330 has the characteristics shown in FIG. 4A.

As shown in FIG. 4A, the dichroic mirror 330 has the characteristic of transmitting light having a wavelength of about 435 to 480 nm, and the characteristic of not transmitting light having a wavelength of about 520 to 550 nm and light having a wavelength of about 620 to 630 nm. That is, the dichroic mirror 330 has the characteristic of transmitting blue light and reflecting green light and red light. As described above, in the present embodiment, a semiconductor laser that emits blue light having a wavelength of 448 nm is used as the first solid-state light source 20. Therefore, almost the entirety of the first emission light is transmitted through the dichroic mirror 330. The transmitted first emission light is collected by the collecting lens 34 located on the optical path, and irradiated onto an area of the phosphor substrate 390 onto which the first phosphor 37 has been applied. The first phosphor 37 is excited by the first emission light to emit the first fluorescence (green). The first fluorescence is incident on the dichroic mirror 330, and reflected by the dichroic mirror 330 having the characteristic of not transmitting but reflecting green light.

Then, the second emission light emitted toward the optical components is incident on the dichroic mirror 630 via the diffuser panel 61 and the concave lens 62. The dichroic mirror 630 has the characteristics shown in FIG. 4B.

As shown in FIG. 4B, the dichroic mirror 630 has the characteristic of transmitting light having a wavelength of about 435 to 480 nm and light having a wavelength of about 520 to 550 nm, and the characteristic of not transmitting light having a wavelength of about 620 to 630 nm. That is, the dichroic mirror 630 has the characteristic of transmitting blue light and green light and reflecting red light. As described above, in the present embodiment, a semiconductor laser that emits blue light having a wavelength of 448 nm is used as the second solid-state light source 50. Therefore, almost the entirety of the second emission light is transmitted through the dichroic mirror 630. The transmitted second emission light is collected by the collecting lens 64 located on the optical path, and irradiated onto an area of the phosphor substrate 390 onto which the second phosphor 38 has been applied. The second phosphor 38 is excited by the second emission light to emit the second fluorescence (red). The second fluorescence is incident on the dichroic mirror 630, reflected by the dichroic mirror 630 having the characteristic of not transmitting but reflecting red light, and then transmitted through the relay lens 65. In addition, the above-described first fluorescence (green) reflected by the dichroic mirror 330 is transmitted through the dichroic mirror 630 via the relay lens 41.

Then, the third emission light emitted toward the optical components is incident on the dichroic mirror 830 via the diffuser panel 81 and the concave lens 82. The dichroic mirror 830 has the characteristics shown in FIG. 4A, similar to the dichroic mirror 330. That is, the dichroic mirror 830 has the characteristic of transmitting blue light and reflecting green light and red light. As described above, in the present embodiment, a semiconductor laser that emits blue light having a wavelength of 448 nm is used as the third solid-state light source 70. Therefore, almost the entirety of the third emission light is transmitted through the dichroic mirror 830. The transmitted third emission light is collected by the collecting lens 84 located on the optical path, and is incident on the optical means 85. Both the first fluorescence (green) and the second fluorescence (red) described above are reflected by the dichroic mirror 830, and thus are collected by the collecting lens 84, and incident on the optical means 85, in a manner similar to the third emission light.

As shown in FIG. 1, the first fluorescence, the second fluorescence, and the third emission light are emitted onto optical axes parallel to each other, and enter the collecting lens 84. Therefore, an optical axis to be obtained can easily be synthesized, and the fluorescence and the emission light can be incident on one collecting lens 84. This allows synthesis of, for example, white light of high intensity.

<Optical Means>

The optical means 85 is provided in order to combine the first fluorescence, the second fluorescence, and the third emission light, which have been collected by the collecting lens 84, into a uniform beam of light. The type of the optical means 85 is not particularly limited. An illuminance uniformizing member such as a fly's eye integrator or a rod integrator can be used. In the present embodiment, a rod integrator is used. Light incident on the rod integrator is propagated to the emission surface of the rod integrator by multipath reflection including total reflection, whereby a beam of light which is nonuniform at the incident surface becomes uniform at the emission surface. The optical means 85 is not essential, but is preferably provided in order to obtain a uniform beam of light as described above.

In the present embodiment, as described above, the third emission light emitted from the third solid-state light source 70 does not excite the first phosphor 37 or the second phosphor 38, and is used as projection light for display as it is. Therefore, three types of color light having different wavelengths can be obtained at the same time, and for example, three types of color light, i.e., green fluorescence, red fluorescence, and blue emission light (laser light) can be combined to obtain white light of high intensity. Since emission light itself is used as projection light for blue color, the loss due to conversion does not occur, unlike in a case where blue fluorescence is used. In addition, since a component for obtaining blue fluorescence is not required, the size and weight of the entire lighting device 100 can be reduced.

In the present embodiment, semiconductor lasers each emitting blue light having a wavelength of 448 nm are used as the first solid-state light source, the second solid-state light source, and the third solid-state light source. However, the present embodiment is not limited thereto. Solid-state light sources each of which can emit light having a different wavelength can be used. That is, a semiconductor laser emitting green light may be used as the second solid-state light source. Also in this case, since the dichroic mirror 630 transmits green light, if a phosphor that is excited by green laser light and emits second fluorescence (red) is used as the second phosphor 38, the first fluorescence, the second fluorescence, and the third emission light are finally collected by the collecting lens 84, and combined into a uniform beam of light by the optical means 85, whereby white light can be obtained.

As described above, the lighting device 100 of the first embodiment including a plurality of light sources can control the lighting timing and the intensity of each light source individually. Therefore, the lighting device 100 can always produce fluorescence (or projection light) having the same wavelength regardless of the lighting timing of each light source, and can combine the produced fluorescence (or projection light) to obtain color light of high intensity.

Second Embodiment

Figure 5:
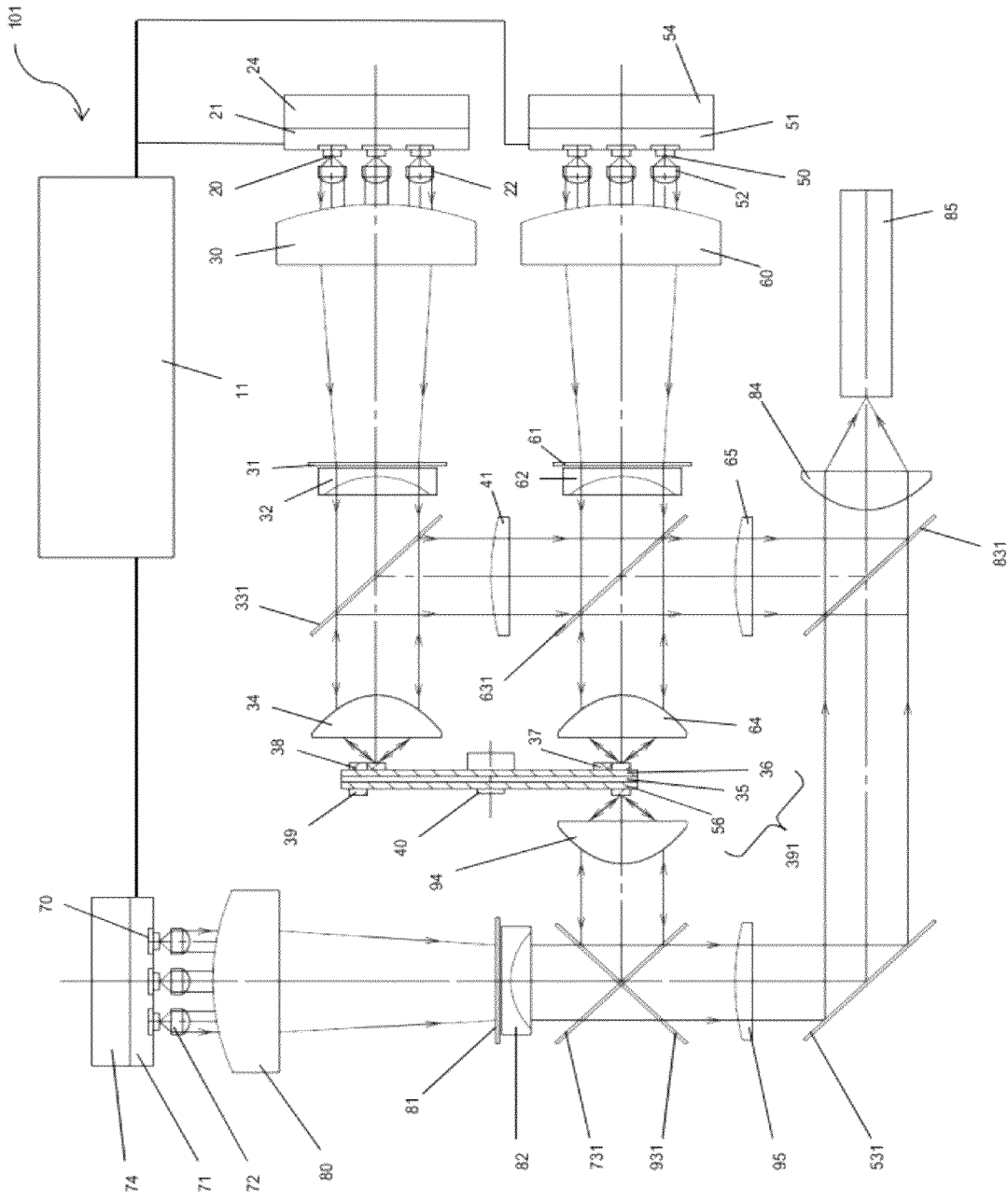
FIG. 5 is a diagram showing the configuration of a lighting device 101 according to a second embodiment of the present invention.
Figure 6:
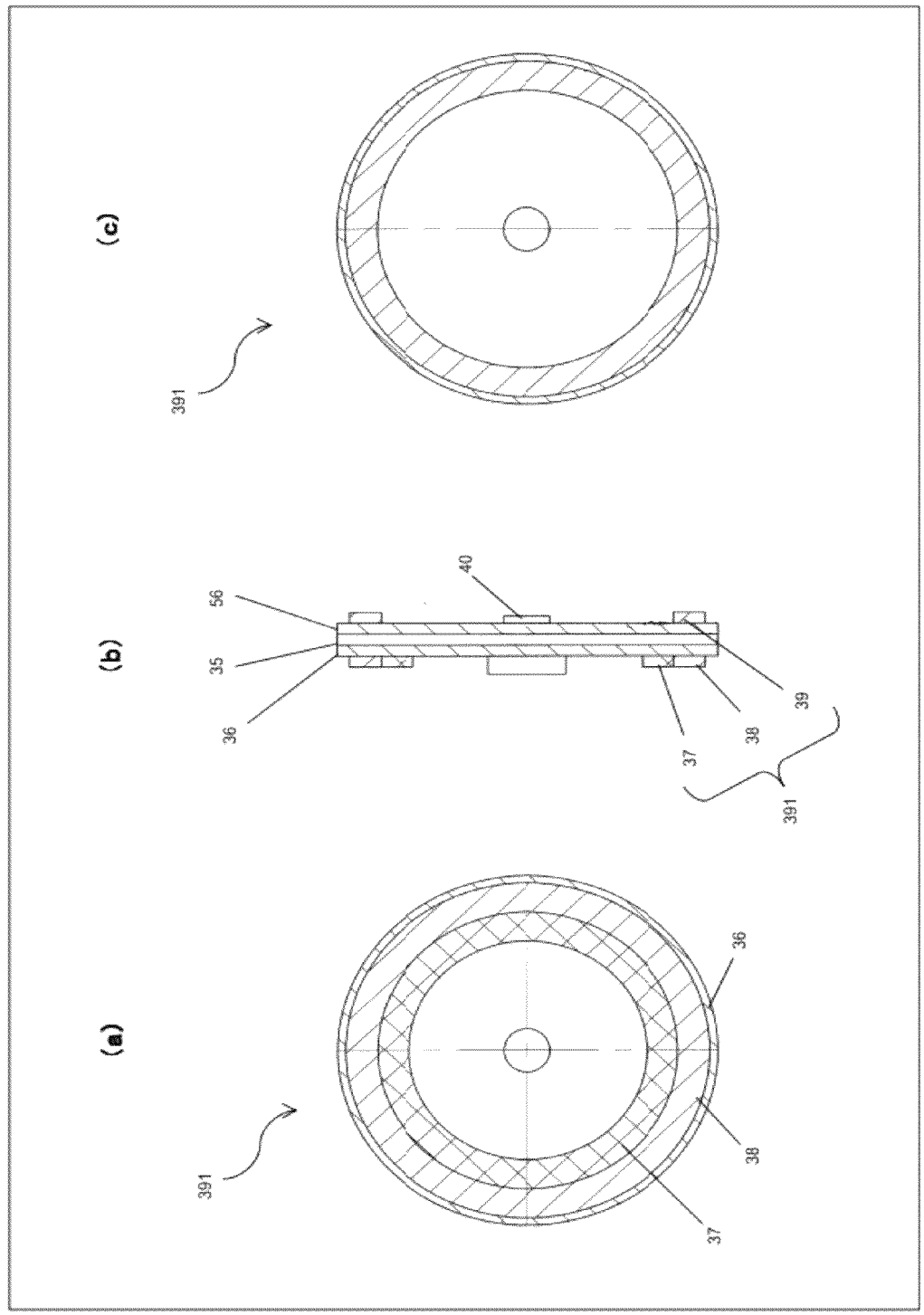
FIG. 6 is diagram illustrating a phosphor substrate 391 used for the lighting device 101 shown in FIG. 5.

FIG. 5 is a diagram showing the configuration of a lighting device 101 according to a second embodiment of the present invention. FIG. 6 is a diagram illustrating a phosphor substrate 391 used for the lighting device 101 shown in FIG. 5, and (a) is a front view, (b) is a side view, and (c) is a back side view.

As shown in FIG. 5, the configuration of the lighting device 101 according to the second embodiment is the same as that of the lighting device 100 according to the first embodiment except that the third emission light emitted from the third solid-state light source 70 acts as excitation light, and a third phosphor 39 applied onto the phosphor substrate 391 emits third fluorescence. Hereinafter, the common components are denoted by the same reference characters, detailed description thereof is omitted, and the lighting device 101 according to the second embodiment will be described focusing on the difference from the first embodiment.

<Solid-State Light Source>

The second embodiment is different from the first embodiment in that semiconductor lasers that emit ultraviolet light (having a wavelength of 405 nm) are used as solid-state light sources. The number of unit light sources constituting each of the solid-state light sources may be the same as described in the first embodiment, and the type and material of the plates and the cooling devices located near the solid-state light sources may also be the same as described above in the first embodiment.

The first emission light emitted from the first solid-state light source 20 is collimated by the collimating lenses 22, and then condensed by the condenser lens 30, and is incident on the optical components arranged on the optical path. The second emission light emitted from the second solid-state light source 50 is collimated by the collimating lenses 52, and then condensed by the condenser lens 60, and is incident on the optical components arranged on the optical path. The third emission light emitted from the third solid-state light source 70 is collimated by the collimating lenses 72, and then condensed by the condenser lens 80, and is incident on the optical components arranged on the optical path.

<Phosphor Substrate>

The phosphor substrate 391 according to the second embodiment is circular similar to the phosphor substrate 390 according to the first embodiment, and the motor 40 is provided so that the phosphor substrate 391 can be driven to rotate about the center of the circle. As shown in FIG. 5, the coating layer 36 is formed on the surface (irradiated with the first emission light and the second emission light) of the main body 35 of the phosphor substrate 391, and a coating layer 56 is similarly formed on the back surface (irradiated with the third emission light) of the main body 35. As in the case of the phosphor substrate 390 of the first embodiment, the first phosphor 37 and the second phosphor 38 are concentrically applied onto the surface of the coating layer 36. In addition, the third phosphor 39 is annularly applied onto the surface of the coating layer 56 formed on the back surface of the main body 35. The first phosphor 37 is irradiated with the first emission light to emit the first fluorescence, the second phosphor 38 is irradiated with the second emission light to emit the second fluorescence, and the third phosphor 39 is irradiated with the third emission light to emit the third fluorescence.

As described above, since all of the light sources used in the second embodiment are light sources that emit ultraviolet light, a phosphor excited by ultraviolet light and emitting the first fluorescence (green) can be used as the first phosphor 37. Similarly, a phosphor excited by ultraviolet light and emitting the second fluorescence (red) can be used as the second phosphor 38. In addition, a phosphor excited by ultraviolet light and emitting the third fluorescence (blue) can be used as the third phosphor 39.

As shown in FIG. 6, the first phosphor 37, the second phosphor 38, and the third phosphor 39 are concentrically applied over the entire 360 degrees continuously. Therefore, even in a case where, for example, the lighting timings or the intensities of the first solid-state light source 20, the second solid-state light source 50, and the third solid-state light source 70 are adjusted, fluorescence having the same wavelength can always be obtained.

<Optical Components>

As shown in FIG. 5, the optical components for the first emission light emitted from the first solid-state light source 20 include the diffuser panel 31, the concave lens 32, a dichroic mirror 331, and the collecting lens 34. The optical components for the second emission light emitted from the second solid-state light source 50 include the diffuser panel 61, the concave lens 62, a dichroic mirror 631, and the collecting lens 64. The optical components for the third emission light emitted from the third solid-state light source 70 include the diffuser panel 81, the concave lens 82, a dichroic mirror 731, a dichroic mirror 931, and a collecting lens 94.

As shown in FIG. 5, the first emission light is incident on the dichroic mirror 331 via the diffuser panel 31 and the concave lens 32. The dichroic mirror 331 has the characteristic of transmitting ultraviolet light and not transmitting green light. As described above, in the second embodiment, a semiconductor laser that emits ultraviolet light having a wavelength of 405 nm is used as the first solid-state light source 20. Therefore, almost the entirety of the first emission light is transmitted through the dichroic mirror 331, collected by the collecting lens 34 located on the optical path, and irradiated onto an area of the phosphor substrate 391 onto which the first phosphor 37 is applied. The first phosphor 37 is excited by the first emission light to emit the first fluorescence (green). The first fluorescence is incident on the dichroic mirror 331, and reflected by the dichroic mirror 331 having the characteristic of not transmitting but reflecting green light.

Similarly, the second emission light is incident on the dichroic mirror 631 via the diffuser panel 61 and the concave lens 62. The dichroic mirror 631 has the characteristic of transmitting ultraviolet light and green light and the characteristic of not transmitting red light. As described above, in the second embodiment, a semiconductor laser that emits ultraviolet light having a wavelength of 405 nm is used as the second solid-state light source 50. Therefore, almost the entirety of the second emission light is transmitted through the dichroic mirror 631, collected by the collecting lens 64 located on the optical path, and irradiated onto an area of the phosphor substrate 391 onto which the second phosphor 38 is applied. The second phosphor 38 is excited by the second emission light to emit the second fluorescence (red). The second fluorescence is incident on the dichroic mirror 631, reflected by the dichroic mirror 631 having the characteristic of not transmitting but reflecting red light, and then transmitted through the relay lens 65. In addition, the above-described first fluorescence (green) reflected by the dichroic mirror 331 is transmitted through the dichroic mirror 631 via the relay lens 41, and then transmitted through the relay lens 65. The first fluorescence and the second fluorescence having been transmitted through the relay lens 65 are incident on the dichroic mirror 831. The dichroic mirror 831 has the characteristic of not transmitting but reflecting green light and red light, and the characteristic of transmitting blue light. Therefore, both the first fluorescence and the second fluorescence are reflected by the dichroic mirror 831, collected by the collecting lens 84, and incident on the optical means 85.

The third emission light is incident on the dichroic mirror 731 via the diffuser panel 81 and the concave lens 82. The dichroic mirror 731 has the characteristic of transmitting blue light and not transmitting ultraviolet light. As described above, in the second embodiment, a semiconductor laser that emits ultraviolet light having a wavelength of 405 nm is used as the third solid-state light source 70. Therefore, almost the entirety of the third emission light is not transmitted through but reflected by the dichroic mirror 731. The reflected third emission light is collected by the collecting lens 94 located on the optical path, and is irradiated onto an area of the phosphor substrate 391 onto which the third phosphor 39 is applied. The third phosphor 39 is excited by the third emission light to emit the third fluorescence (blue). The third fluorescence is incident on the dichroic mirror 931, and reflected by the dichroic mirror 931 having the characteristic of transmitting ultraviolet light and not transmitting blue light. The reflected third fluorescence is incident on a dichroic mirror 531 via a relay lens 95. The dichroic mirror 531 has the characteristic of not transmitting but reflecting blue light, similar to the dichroic mirror 931. Therefore, the third fluorescence is reflected by the dichroic mirror 531, then transmitted through the dichroic mirror 831, collected by the collecting lens 84, and is incident on the optical means 85.

As shown in FIG. 5, the first fluorescence, the second fluorescence, and the third fluorescence are emitted onto optical axes parallel to each other, and enter the collecting lens 84. Therefore, an optical axis to be obtained can easily be synthesized, and the fluorescence can be incident on one collecting lens. This allows synthesis of, for example, white light of high intensity.

Further, in the second embodiment, the third phosphor 39 is excited by the third emission light acting as excitation light to obtain blue fluorescence. If blue light is obtained not as projection light but as fluorescence in the above manner, blue color can be prevented from becoming too dark, a desired color can easily be produced by combining the blue fluorescence with the other fluorescence, and the quality of an image to be obtained can be improved, as compared to when blue light that is projection light is used.

Third Embodiment

Figure 7:
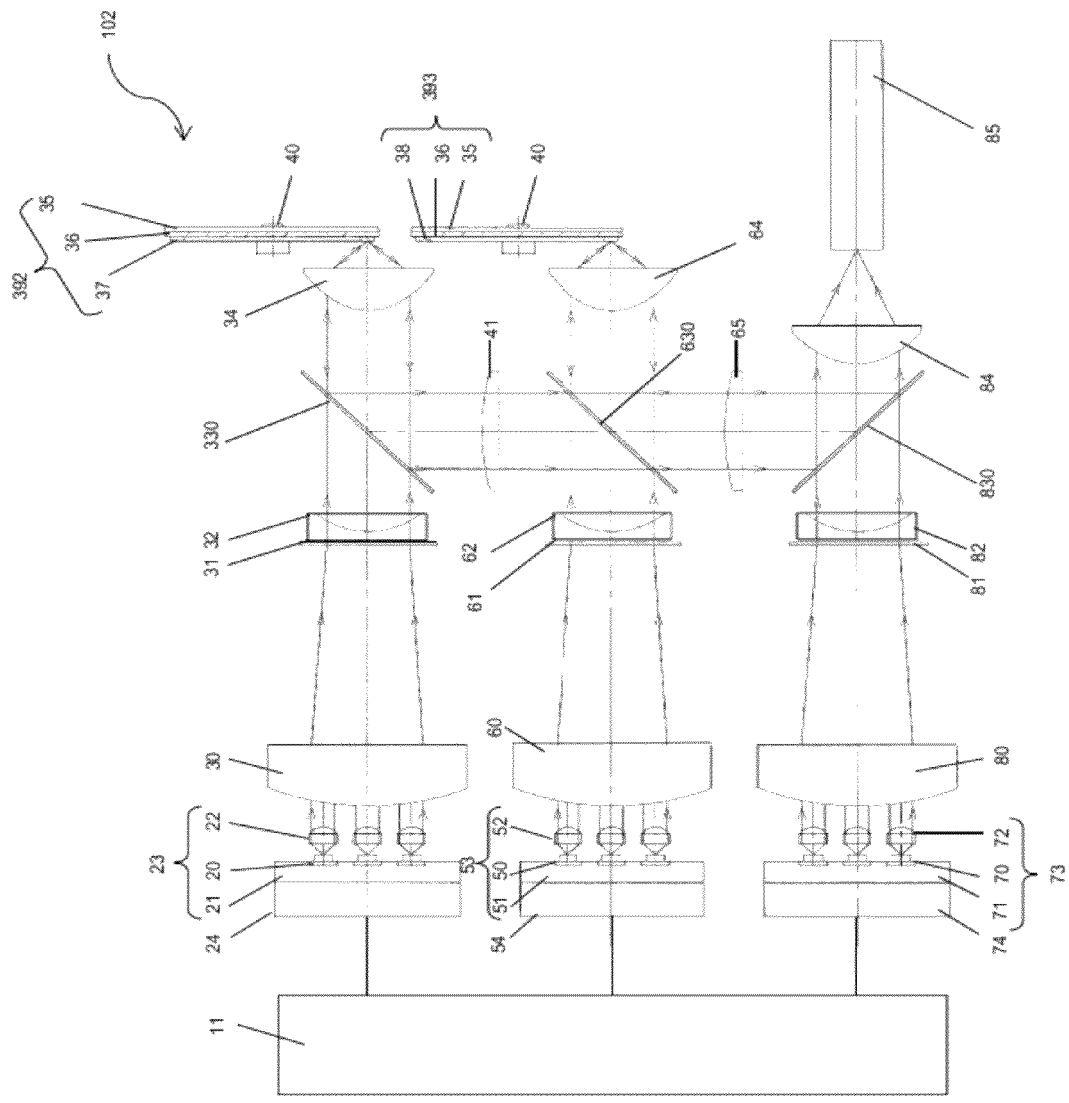
FIG. 7 is a diagram showing the configuration of a lighting device 102 according to a third embodiment of the present invention.

FIG. 7 is a diagram showing the configuration of a lighting device 102 according to a third embodiment of the present invention.

As shown in FIG. 7, the configuration of the lighting device 102 according to the third embodiment is the same as that of the lighting device 100 according to the first embodiment except that two phosphor substrates, that is, a phosphor substrate 392 onto which the first phosphor 37 is applied, and a phosphor substrate 393 onto which the second phosphor 38 is applied, are used. Hereinafter, the common components are denoted by the same reference characters, detailed description thereof is omitted, and the lighting device 102 according to the third embodiment will be described focusing on the difference from the first embodiment.

<Phosphor Substrate>

In the third embodiment, two phosphor substrates, the phosphor substrate 392 and the phosphor substrate 393, are used. These phosphor substrates are circular similar to the phosphor substrate 390 according to the first embodiment, and the motor 40 is provided to each phosphor substrate so that the phosphor substrate can be driven to rotate about the center of the circle. As shown in FIG. 7, the coating layer 36 is formed on the surface (irradiated with the first emission light or the second emission light) of the main body 35 of each phosphor substrate. The first phosphor 37 is concentrically applied onto the surface of the coating layer 36 of the phosphor substrate 392, and the second phosphor 38 is concentrically applied onto the surface of the coating layer 36 of the phosphor substrate 393. That is, in the third embodiment, one phosphor is applied onto each phosphor substrate.

As described above, the lighting device 102 according to the third embodiment including a plurality of light sources can control the lighting timing and the intensity of each light source individually. Therefore, the lighting device 102 can always produce fluorescence (or projection light) having the same wavelength regardless of the lighting timing of each light source, and can combine the produced fluorescence (or projection light) to obtain color light of high intensity.

In the third embodiment, the case where the number of phosphor substrates is two has been described as an example for comparison with the lighting device 100 according to the first embodiment. However, in a case where semiconductor lasers that emit ultraviolet light (having a wavelength of 405 nm) are used as light sources as in the lighting device 101 according to the second embodiment, the number of phosphor substrates may be three, and the first to third phosphors may be applied onto the three phosphor substrates, respectively. Further, the number of phosphor substrates may be two, and phosphors of three colors may be used for the two phosphor substrates. That is, the phosphor substrate 390 (used in the first embodiment) onto which the first and the second phosphors are applied may be used as one of the two phosphor substrates, and a phosphor substrate onto which the third phosphor is applied may used as the other. Further, also in a case where it is desired to obtain color light of four or more colors, one phosphor substrate onto which four phosphors are applied may be used, or a plurality of phosphor substrates onto each of which one or more phosphors are applied may be used. That is, the number of phosphor substrates, and the number and type of phosphors applied onto each phosphor substrate can freely be selected.

Fourth Embodiment

Figure 8:
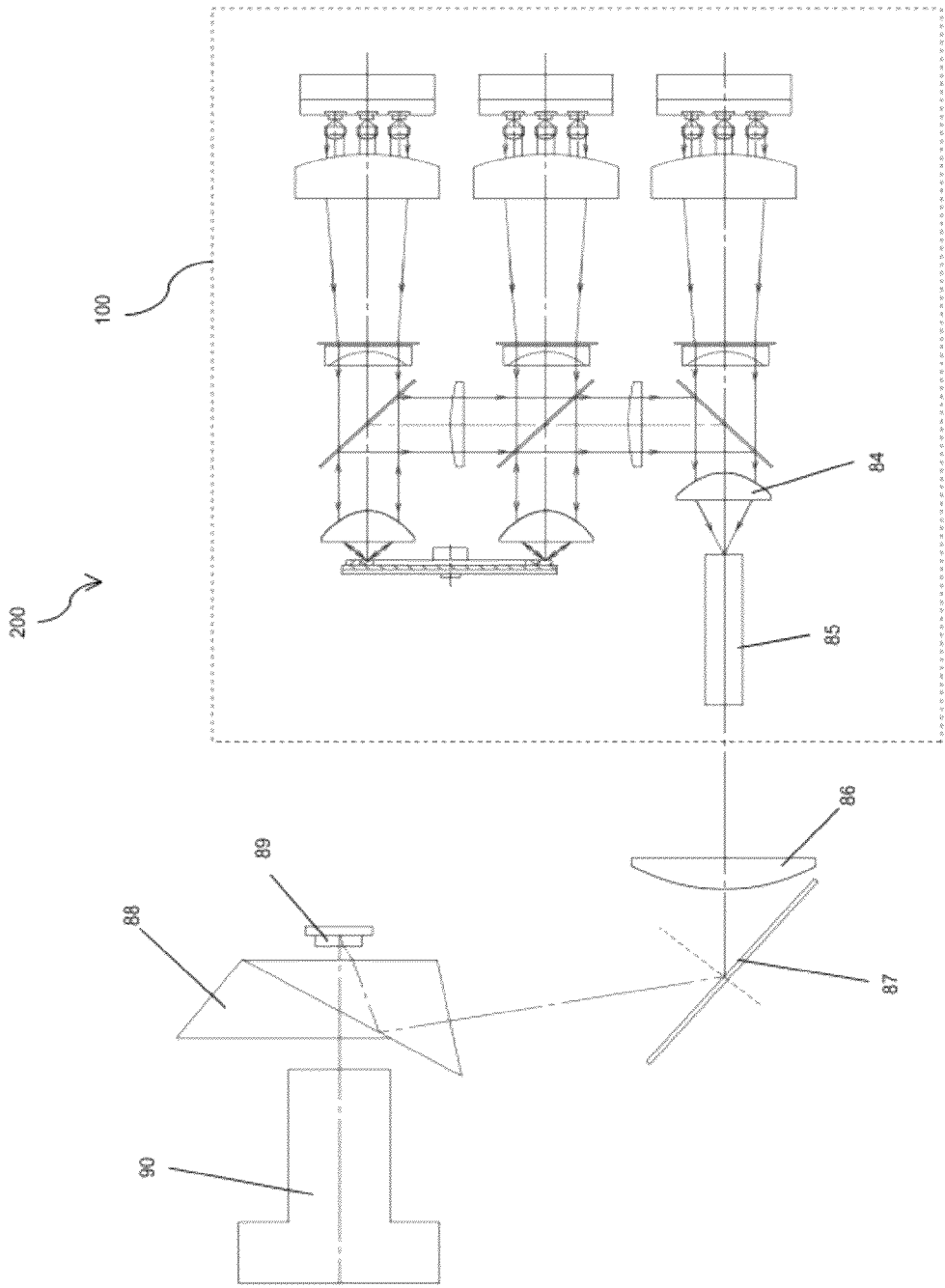
FIG. 8 is a diagram showing the configuration of a projection-type display apparatus 200 according to a fourth embodiment of the present invention.

FIG. 8 is a diagram showing the configuration of a projection-type display apparatus 200 according to a fourth embodiment of the present invention.

The configuration of the projection-type display apparatus 200 is an example of the configuration of a DLP (Digital Light Processing, registered trademark owned by Texas Instruments) projector that includes the lighting device 100 according to the first embodiment. The description of the lighting device 100 is omitted.

As shown in FIG. 8, light having been collected by the collecting lens 84 is incident on the optical means (rod integrator) 85. A uniform beam of light emitted from the emission surface of the optical means 85 passes through a relay lens 86, is reflected by a reflective mirror 87, and is incident on a total reflection prism 88. The total reflection prism 88 is a prism that totally reflects light and projects projection light from a DMD 89 which is an image display element. The light emitted from the optical means 85 is formed into a rectangular shape which is similar to the shape of a display area on the DMD 89, and uniformly illuminates the surface of the DMD 89 with high efficiency. Of the light incident on the DMD 89, only the beams of light that are necessary for image formation are polarized in accordance with an image signal, transmitted through the total reflection prism 88, and then incident on a projection lens 90. The projection lens 90 magnifies and projects image light formed through modulation by the DMD 89.

Fifth Embodiment

Figure 9:
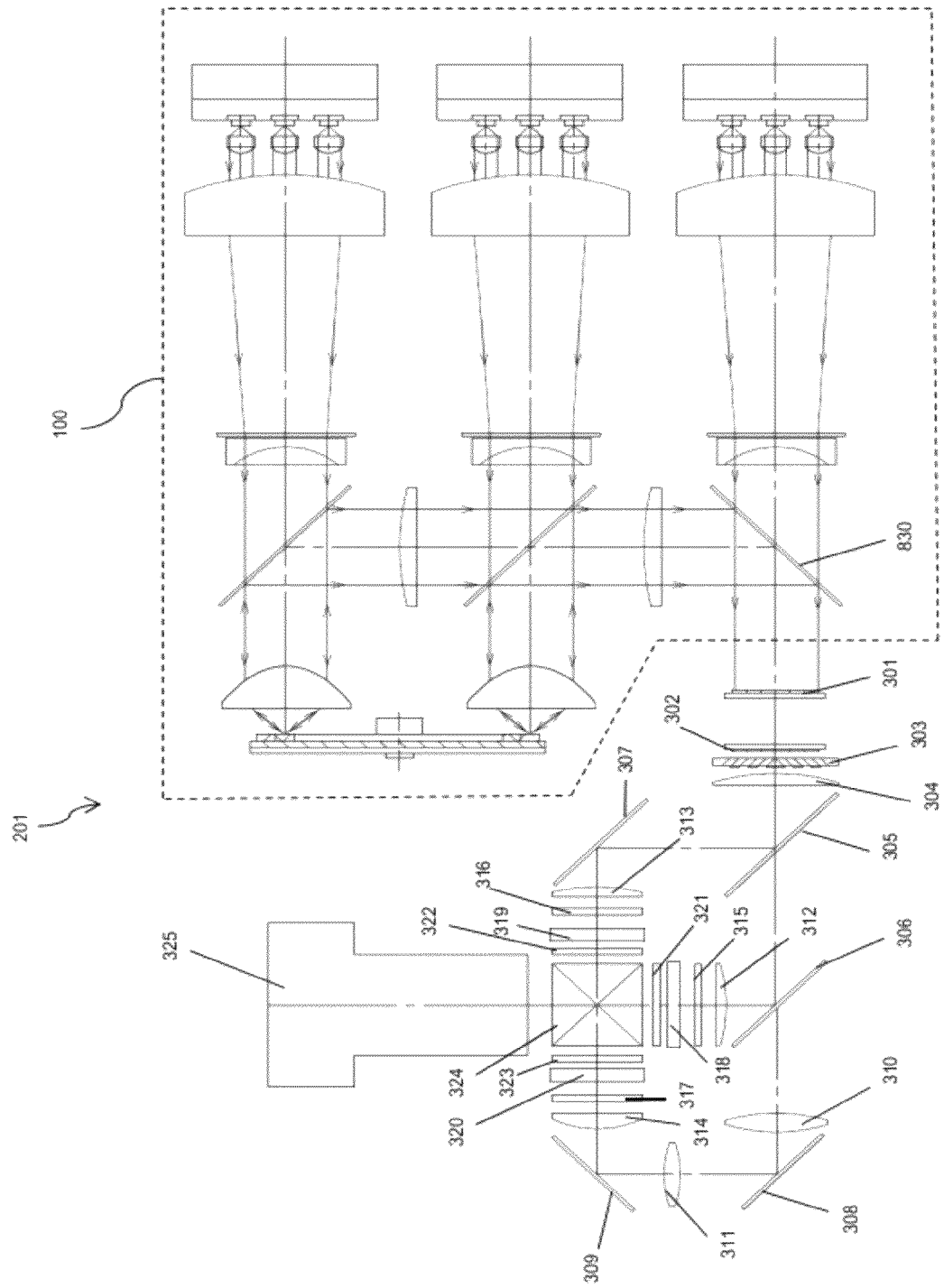
FIG. 9 is a diagram showing the configuration of a projection-type display apparatus 201 according to a fifth embodiment of the present invention.
Figure 10:
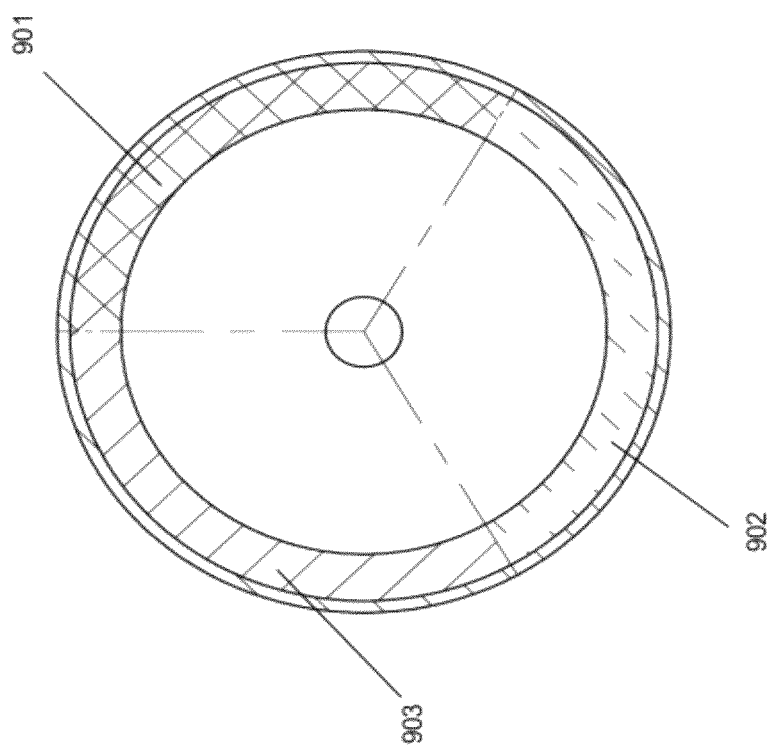
FIG. 10 is a diagram illustrating a phosphor wheel used in a conventional lighting device.

FIG. 9 is a diagram showing the configuration of a projection-type display apparatus 201 according to a fifth embodiment of the present invention.

The configuration of the projection-type display apparatus 201 is another example of the configuration of the DLP projector that includes the lighting device 100 according to the first embodiment. It should be noted that there is a difference in that the optical means 85 is omitted.

As shown in FIG. 9, the first fluorescence and the second fluorescence reflected by the dichroic mirror 830, and the third emission light (laser light) transmitted through the dichroic mirror 830, are incident on a first lens array plate 301 composed of a plurality of lens elements. The beam of light incident on the first lens array plate 301 is divided into a large number of beams of light. The large number of beams of light produced by the division converge on a second lens array plate 302 composed of a plurality of lenses. The lens elements of the first lens array plate 301 have a shape similar to liquid crystal panels 318 to 320 and have an opening. The focal lengths of the lens elements of the second lens array plate 302 are determined such that the first lens array plate 301 is substantially conjugate to the liquid crystal panels 318 to 320. The light emitted from the second lens array plate 302 is incident on a polarization conversion optical element 303. The polarization conversion optical element 303 is composed of a polarizing prism and a ½ wave plate, and converts natural light from a light source into light polarized in one direction. The light from the polarization conversion optical element 303 is incident on a superimposing lens 304. The superimposing lens 304 is a lens for superimposing light emitted from the lens elements of the second lens array plate 302 and illuminating the liquid crystal panels 318 to 320 with the superimposed light. The first lens array plate 301, the second lens array plate 302, the polarization conversion optical element 303, and the superimposing lens 304 are used as illumination means.

The light from the superimposing lens 304 is separated into blue light, green light, and red light, by color separation means, i.e., a dichroic mirror 305 that reflects blue light and a dichroic mirror 306 that reflects green light. The green light is transmitted through a field lens 312 and an incidence-side polarizing plate 315, and incident on the liquid crystal panel 318. The blue light is reflected by a reflective mirror 307, then transmitted through a field lens 313 and an incidence-side polarizing plate 316, and incident on the liquid crystal panel 319. The red light is transmitted through, refracted by, and reflected by a relay lens 310, a reflective lens 308, and a reflective lens 309, and then transmitted through a field lens 314 and an incidence-side polarizing plate 317, and incident on the liquid crystal panel 320. The three liquid crystal panels 318 to 320 each change the polarization of the incident light by controlling applied voltages to pixels in accordance with an image signal, and the light is modulated by using combination of the incidence-side polarizing plates 315 to 317 and emission-side polarizing plates 321 to 323 which are located perpendicular to the transmission axes on both sides of the liquid crystal panels 318 to 320, respectively. In this manner, green, blue, and red images are formed. The green light, the blue light, and the red light transmitted through the emission-side polarizing plates 321 to 323, respectively, are incident on a color combining prism 34, and the red light and the blue light are reflected by a dichroic mirror that does not transmit but reflects red light and a dichroic mirror that does not transmit but reflects blue light, respectively, and then combined with the green light. The resultant light is incident on a projection lens 325, and magnified and projected onto a screen (not shown).

As described above, the projection-type display apparatuses 200 and 201 according to the fourth and fifth embodiments of the present invention each include a lighting device that includes a plurality of light sources and can control the lighting timing and the intensity of each light source individually. Since the lighting device can always produce fluorescence (or projection light) having the same wavelength regardless of the lighting timing of each light source, and can combine the produced fluorescence (or projection light) to obtain color light of high intensity, a projection-type display apparatus with long life and high brightness can be configured.

Further, in the projection-type display apparatus 201 according to the fifth embodiment, three liquid crystal panels utilizing polarization of light are used as light valves. Therefore, it is possible to obtain a bright and high-definition projection image having no color breaking and having excellent reproducibility of white color.

The lighting device of the present invention is applicable not only to projectors, but also to optical systems of various projection-type display apparatuses such as rear-projection display apparatuses.

While the present invention has been described in detail, the foregoing description is in all aspects illustrative and not restrictive. It will be understood that numerous other modifications and variations can be devised without departing from the scope of the invention.

What is claimed is:

1. A lighting device configured to output light of predetermined color, comprising:
   a plurality of solid-state light sources including at least a first solid-state light source, a second solid-state light source, and a third solid-state light source;
   a drive section configured to drive each of the plurality of solid-state light sources; and
   a phosphor singular substrate including a first phosphor onto which in a first position first emission light is emitted as an excitation light beam from the first solid-state light source, and a second phosphor onto which in a second position different from the first position second emission light is emitted as an excitation light beam from the second solid-state light source; wherein
   first fluorescence emitted by the first phosphor through excitation by the first emission light and second fluorescence emitted by the second phosphor through excitation by the second emission light are of different color, and
   third emission light emitted from the third solid-state light source is outputted not through the excitation of a phosphor.

2. The lighting device according to claim 1, wherein emission light emitted from the plurality of solid-state light sources have different wavelengths.

3. The lighting device according to claim 1, further comprising an intensity distribution changing section configured to dynamically change the intensities of the plurality of the light sources in accordance with at least one of an image-display mode and a displayed image.

4. The lighting device according to claim 1, wherein the first fluorescence, the second fluorescence, and the third emission light are combined to obtain white light.

5. The lighting device according to claim 1, further comprising an optical section configured to combine the first fluorescence, the second fluorescence, and the third emission light into a beam of light.

6. The lighting device according to claim 5, wherein the optical section is a dichroic mirror.

7. The lighting device according to claim 1, wherein
   the phosphor singular substrate is a circular and flat plate, and is controlled to rotate, and
   the first phosphor and the second phosphor are present on the phosphor singular substrate concentrically applied onto different areas of the phosphor singular substrate.

8. The lighting device according to claim 1, wherein an optical axis of the first fluorescence, an optical axis of the second fluorescence, and an optical axis of the third emission light are parallel to each other.

9. The lighting device according to claim 1, wherein
   the first solid-state light source, the second solid-state light source, and the third solid-state light source are each a semiconductor laser that emits blue light,
   the first fluorescence is green, and
   the second fluorescence is red.

10. A projection-type display apparatus comprising:
    the lighting device according to claim 1;
    an optical section configured to guide a beam of emission light emitted from the lighting device;
    an image display element configured to modulate the emission light guided by the optical section in accordance with an image signal; and
    a projection lens configured to project the emission light modulated by the image display element onto a screen.

11. A lighting device configured to output light of predetermined color, comprising:
    a plurality of solid-state light sources including at least a first solid-state light source, a second solid-state light source, and a third solid-state light source;
    a drive section configured to drive each of the plurality of solid-state light sources; and
    a phosphor singular substrate including a first phosphor onto which in a first position first emission light is emitted as an excitation light beam from the first solid-state light source, and a second phosphor onto which in a second position different from the first position second emission light is emitted as an excitation light beam from the second solid-state light source; wherein
    first fluorescence emitted by the first phosphor through excitation by the first emission light and second fluorescence emitted by the second phosphor through excitation by the second emission light are of different color, and
    the lighting device further comprises a third phosphor for excitation by third emission light emitted from the third solid-state light source to emit third fluorescence having a wavelength longer than those of the first fluorescence and the second fluorescence.

12. The lighting device according to claim 11, wherein the first fluorescence, the second fluorescence, and the third fluorescence are combined to obtain white light.

13. The lighting device according to claim 11, further comprising an optical section configured to combine the first fluorescence, the second fluorescence, and the third fluorescence into a beam of light.

14. The lighting device according to claim 13, wherein the optical section is a dichroic mirror.

15. The lighting device according to claim 11, wherein an optical axis of the first fluorescence, an optical axis of the second fluorescence, and an optical axis of the third fluorescence are parallel to each other.

16. The lighting device according to claim 11, wherein
the first solid-state light source, the second solid-state light source, and the third solid-state light source are each a semiconductor laser that emits ultraviolet light,
the first fluorescence is green,
the second fluorescence is red, and
the third fluorescence is blue.

17. The lighting device according to claim 11, wherein emission light emitted from the plurality of solid-state light sources have different wavelengths.

18. The lighting device according to claim 11, further comprising an intensity distribution changing section configured to dynamically change the intensities of the plurality of the light sources in accordance with at least one of an image-display mode and a displayed image.

19. The lighting device according to claim 11, wherein
the phosphor singular substrate is a circular and flat plate, and is controlled to rotate, and
the first phosphor and the second phosphor are present on the phosphor singular substrate concentrically applied onto different areas of the phosphor singular substrate.

20. A projection-type display apparatus comprising:
the lighting device according to claim 11;
an optical section configured to guide a beam of emission light emitted from the lighting device;
an image display element configured to modulate the emission light guided by the optical section in accordance with an image signal; and
a projection lens configured to project the emission light modulated by the image display element onto a screen.

* * * * *